United States Patent
Holaso

(10) Patent No.: US 10,031,494 B2
(45) Date of Patent: Jul. 24, 2018

(54) DASHBOARD AND BUTTON/TILE SYSTEM FOR AN INTERFACE

(71) Applicant: Honeywell International Inc., Morristown, NJ (US)

(72) Inventor: Albert Holaso, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 211 days.

(21) Appl. No.: 14/461,188

(22) Filed: Aug. 15, 2014

(65) Prior Publication Data
US 2016/0048312 A1 Feb. 18, 2016

(51) Int. Cl.
*G06F 3/0484* (2013.01)
*G05B 15/02* (2006.01)

(52) U.S. Cl.
CPC .... *G05B 15/02* (2013.01); *G05B 2219/23084* (2013.01); *G05B 2219/2642* (2013.01)

(58) Field of Classification Search
CPC .......................... G06F 3/04847; G06F 3/04842
See application file for complete search history.

(56) References Cited

U.S. PATENT DOCUMENTS

| | | | |
|---|---|---|---|
| 7,295,116 B2 | 11/2007 | Kumar et al. | |
| 8,099,178 B2 | 1/2012 | Mairs et al. | |
| 8,151,280 B2 | 4/2012 | Sather et al. | |
| 8,176,095 B2 | 5/2012 | Murray et al. | |
| 8,219,660 B2 | 7/2012 | McCoy et al. | |
| 8,271,941 B2 | 9/2012 | Zhang et al. | |
| 8,302,020 B2 | 10/2012 | Louch et al. | |
| 8,375,118 B2 | 2/2013 | Hao et al. | |
| 8,516,016 B2 | 8/2013 | Park et al. | |
| 8,869,027 B2 | 10/2014 | Louch et al. | |
| 2005/0119767 A1 | 6/2005 | Kiwimagi et al. | |
| 2008/0222565 A1 | 9/2008 | Taylor et al. | |
| 2009/0024944 A1* | 1/2009 | Louch ................. | G06F 3/04817 715/765 |
| 2009/0027225 A1* | 1/2009 | Farley ..................... | G08B 7/06 340/6.11 |
| 2009/0322782 A1 | 12/2009 | Kimchi et al. | |

(Continued)

FOREIGN PATENT DOCUMENTS

| | | |
|---|---|---|
| WO | WO 2009/012319 | 1/2009 |
| WO | WO 2013/062725 | 5/2013 |

OTHER PUBLICATIONS

"4.0 Today's Activities, The Home Dashboard," CRBM info@hand website, 46 pages, prior to Apr. 25, 2013.

(Continued)

*Primary Examiner* — Anil Bhargava
(74) *Attorney, Agent, or Firm* — Seager Tufte & Wickhem LLP

(57) ABSTRACT

A system and approach having a display that shows a dashboard of smart buttons or tiles. The smart buttons or tiles may be situated in a matrix-like or other arrangement on the dashboard. The display may be customized. A smart button or tile may be operated like a standard button but conveniently pull summary information about a particular area of, for instance, a building controls system, for a user. The arrangement may permit the user to view the health of the whole system at a glance and permit the user a shortcut to see details of the particular area of the system quickly.

19 Claims, 21 Drawing Sheets

(56) References Cited

U.S. PATENT DOCUMENTS

| | | | | |
|---|---|---|---|---|
| 2010/0058248 | A1* | 3/2010 | Park | G06F 3/0481 715/851 |
| 2010/0107070 | A1* | 4/2010 | Devineni | B60H 1/00985 715/702 |
| 2010/0107111 | A1* | 4/2010 | Mirza | G06F 3/04886 715/777 |
| 2010/0107112 | A1* | 4/2010 | Jennings | G06F 1/3203 715/777 |
| 2010/0286937 | A1 | 11/2010 | Hedley et al. | |
| 2010/0318200 | A1 | 12/2010 | Foslien et al. | |
| 2011/0087988 | A1* | 4/2011 | Ray | G06Q 10/06 715/771 |
| 2012/0089920 | A1* | 4/2012 | Eick | G08G 1/20 715/739 |
| 2012/0130513 | A1* | 5/2012 | Hao | G05B 15/02 700/90 |
| 2012/0259466 | A1 | 10/2012 | Ray et al. | |
| 2012/0291068 | A1 | 11/2012 | Khushoo et al. | |
| 2013/0289774 | A1 | 10/2013 | Day et al. | |
| 2014/0108985 | A1* | 4/2014 | Scott | G06F 3/0484 715/771 |
| 2014/0139342 | A1* | 5/2014 | Brown | G08B 21/12 340/603 |
| 2015/0100164 | A1* | 4/2015 | Craig | G05B 15/02 700/276 |
| 2015/0168949 | A1* | 6/2015 | Hua | G06F 3/0481 702/188 |

OTHER PUBLICATIONS

"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/109,496, filed Dec. 17, 2013.
U.S. Appl. No. 14/163,850, filed Jan. 24, 2014.
U.S. Appl. No. 14/169,071, filed Jan. 30, 2014.
U.S. Appl. No. 14/169,083, filed Jan. 30, 2014.
U.S. Appl. No. 14/482,607, filed Sep. 10, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
Preuveneers et al., "Intelligent Widgets for Intuitive Interaction and Coordination in Smart Home Environments," IEEE Proceedings of Eighth International Conference on Intelligent Environments, pp. 157-164, 2012.
Wu et al., "A Web 2.0-Based Scientific Application Framework," 7 pages, prior to Jan. 30, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.comnetwork/apps.php#homepage, "Lucid Building Dashboard Network—Apps," 9 pages, printed Jan. 15, 2013.

* cited by examiner

US 10,031,494 B2

DASHBOARD AND BUTTON/TILE SYSTEM FOR AN INTERFACE

BACKGROUND

The present disclosure pertains to displays, and particularly to those of heating, ventilation and air conditioning systems.

SUMMARY

The disclosure reveals a system and approach having a display that shows a dashboard of smart buttons or tiles. The smart buttons or tiles may be situated in a matrix-like or other arrangement on the dashboard. The display may be customized. A smart button or tile may be operated like a standard button but conveniently pull summary information about a particular area of, for instance, a building controls system, for a user. The arrangement may permit the user to view the health of the whole system at a glance and permit the user a shortcut to see details of the particular area of the system quickly.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present graphical user interfaces may be used for the next generation building automation software. An ornamental design for display screens or portion thereof with animated graphical user interface may be shown. There may be a module carousel for building control equipment display.

A modular information approach may be provided. A standard building graphic display may be information designed to deliver consumable items (e.g., groups) of data related to the equipment or system display. The items may be modular and be removed or added to piece by piece depending on category, technology, or any other functional grouping.

Dashboard and tile system for a software interface may be considered. There may be software design elements for changing between applications. There may be smart tiles for feature navigation.

Each smart tile may pull summary information to the user so that it can significantly reduce work effort and information gathering.

A dashboard may be a matrix of smart tiles that allows a user to view the health of a building controls system at a glance and allow a user a quick shortcut to delve into details of any particular area quickly.

Figure 1:
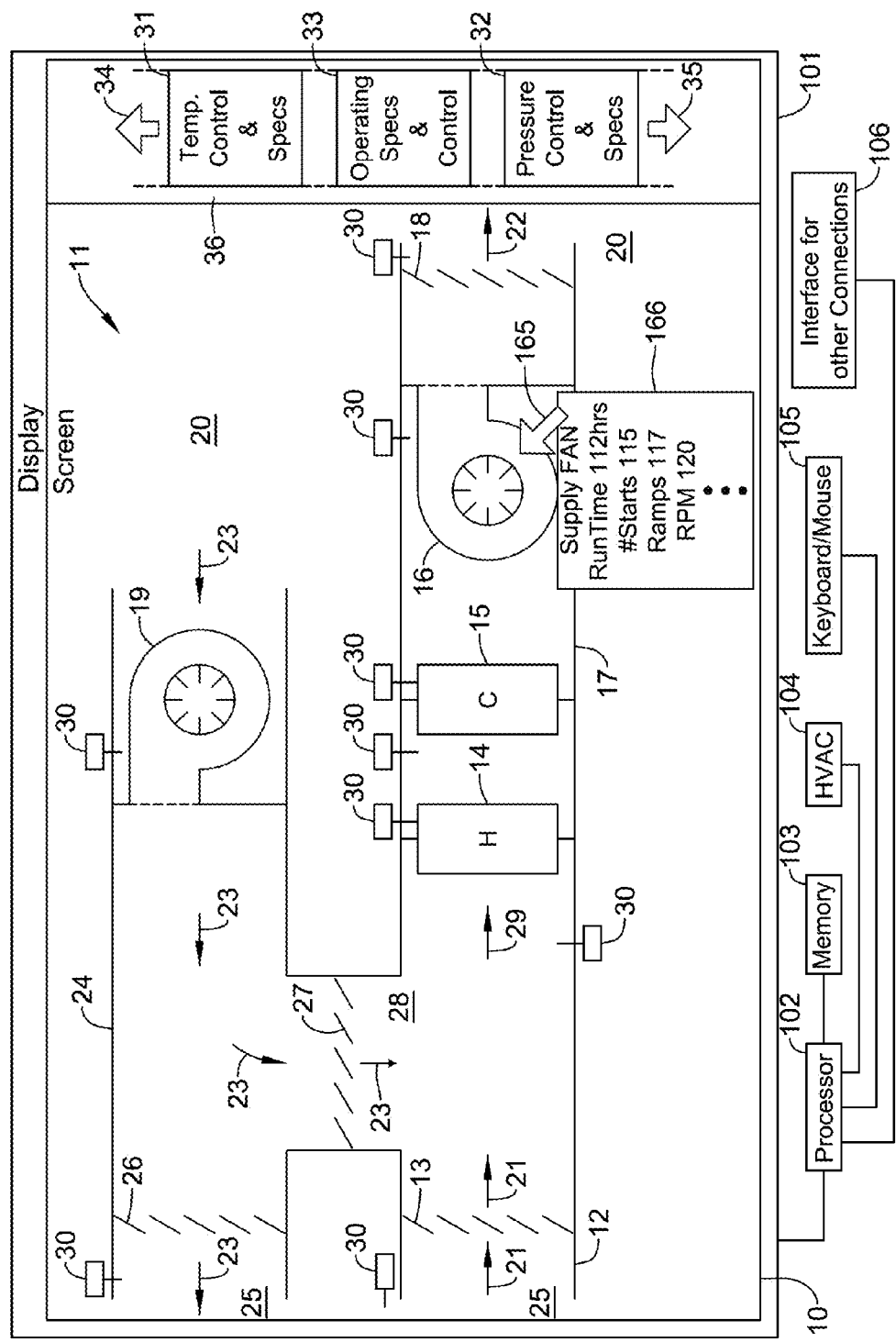
FIG. 1 is a diagram of a screen with a cutaway view showing a perspective of a heating, ventilation and air conditioning system, and data portions proximate to the perspective.

FIG. 1 is a diagram of a display 101 showing a graphic screen 10 with a cutaway view showing a perspective of a heating, ventilation and air conditioning (HVAC) system 11, and data sensors and control components 30 proximate to and indicating data and parameter information of components shown in the perspective on screen 10.

A cursor 165 may be moved around on screen 10. For instance, one may right-click or mouse-over on a component, such as a heating coil 14, damper 27, fan 16, and so forth, to get a pop-up tool-tip like an information card 166. For example, cursor 165 may be placed with a mouse on fan 16 to get a pop-up like information card 166 providing critical information about the fan to a user, such as runtime, number of starts, running amperes, and so on. The data presented may be defined an application profile for the associated piece of equipment depicted by a graphical element.

Outside air 21 from outside 25 may be drawn in at a duct 12 through a damper 13, a heating coil 14 and a cooling coil 15 by a supply fan 16. Supply fan 16 may provide supply air 22 through a duct 17 and a damper 18 into a space 20 which is to be heated or cooled and ventilated with circulation of air. Return air 23 may be drawn from space 20 by a return air fan 19 into a duct 24. Some return air 23 may exhausted out to outside 25 via a damper 26. Some return air 23 may go through a damper 27 to a mixing space 28 where air 23 can be mixed with some outside air 21 to result in mixed air 29 which is drawn through coils 14 and 15 to become supply air 22. The amount of return air 23 exhausted, the amount of outside air 21 brought in, and a mixture of return air 23 and outside air 21 to become mixed air 29 are at least partially controlled by dampers 13, 26 and 27. The amounts and mixtures of the air may also be controlled in part by supply fan 16 and return fan 19. A temperature of supply air may be controlled at least in part by coils 14 and 15 which can be controlled by heating and cooling valves, respectively. The mixed air 29 temperature may be controlled at least in part by dampers 13, 26 and 27. The pressure of the air in space 20 may be controlled at least in part by a combination of dampers 13, 26 and 27, and fans 16 and 19.

Screen 10 of FIG. 1 may incorporate control and information modules in a carousel 36 such as temperature control and specs 31, pressure control and specs 32 and operating specs and control 33. Other examples of the modules relating to system 11 may be incorporated in screen 10. Arrows 34 and 35 may allow a user to scroll through other modules (not presently shown) related to system 11.

Screen 10 may also incorporate a portion (not shown), entitled relationships that list systems, such as a boiler and chiller, application profiles, such as a standard VAV, office scheduler, conference scheduler, and so on. The portion may also list zones, such as interior zones, perimeter zones, zones in alarm, and so on. An alarm history for today, the last 7 days, last 30 days, and so on, may be listed in the portion. Screen 10 may incorporate more or fewer portions.

Screen 10 may be shown on a display 101. Display 101 may be connected to a processor 102. A memory 103 may be connected to processor 102. Processor 102 may be connected to HVAC 104. Connections to processor 102 may include components 30 including sensors, actuators, and the like of HVAC 104. A keyboard/mouse 105 may be connected to processor 102. Display 101 and keyboard/mouse 105 may constitute at least a portion for the user interface for processor 102. Processor 102 may be connected to an interface 106 for other connections such as the internet, a building automation system, and so forth.

The software engine driving display 101 may be directly linked to an application profile that is a grouping of data and/or algorithms with a specific focus. For example, the focus may be around set points, or space temperatures, or security.

The information structure of screen 10 may be compatible with a drop-in app system. When a new feature drop-in is added to an existing running system, it may have an associated information display module that will be automatically available to view in a carousel 36. Users may be able to pick and choose what data modules to include in the carousel display system. The data modules may require no configuration out-of-the-box because virtually all data are culled from the application profile. Essentially, the data are dynamically pre-configured. The data modules may be equipment and device agnostic in that the modules may work with any equipment and devices because what appears to matter is the data type and data purpose. Data type and data purpose may drive the information displayed in the data modules.

Figure 2:
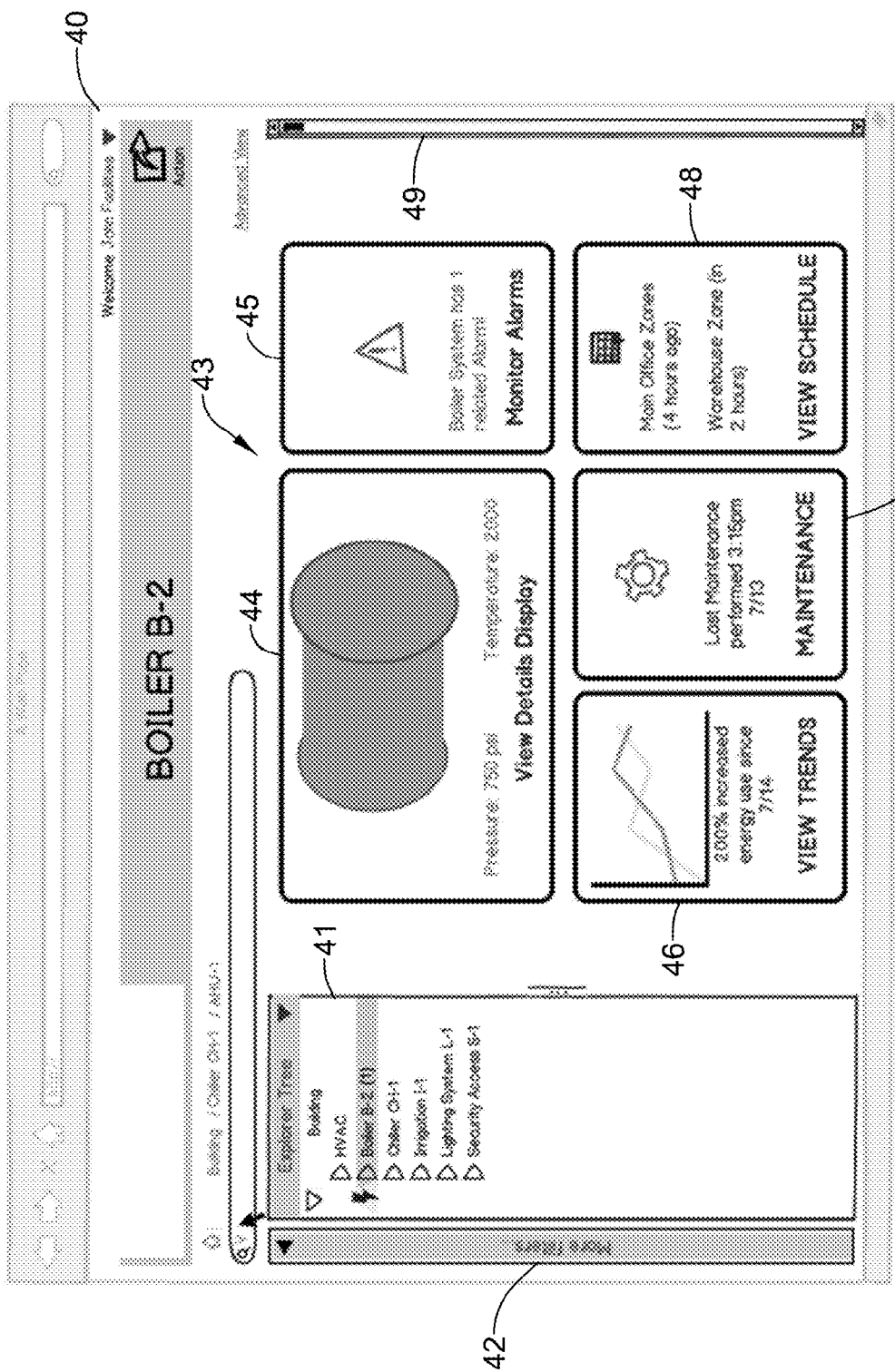
FIG. 2 is a diagram of a screen that may reveal details of equipment in a building as indicated by an explorer tree.

FIG. 2 is a diagram of a screen 40 that may reveal details of equipment in a building as indicated by an explorer tree 41. More filters may be available by pressing a bar 42. Explorer tree 41 may indicate a building and a list of equipment in the building such as an HVAC, Boiler B-2(1) Chiller CH-1, Irrigation I-1, Lighting System L-1 and Security Access S-1. Boiler B-2 may be selected resulting in an information and data portion 43 of screen 40. Examples of information and data may be shown in sub-portions 44, 45, 46, 47 and 48. More information and data about Boiler B-2 may obtained by scrolling shown or up on the screen with a bar 49.

Sub-portion 44 may be a details display with a diagram representing the selected equipment and including some data such as pressure and temperature of the equipment such as the boiler. Sub-portion 45 may indicate monitored alarms. Sub-portion 46 may indicate trends such as that of an increase in energy over time. Trends may be available for many equipment selections. Sub-portion 47 may reveal a record of previous maintenance. The maintenance sub-portion may be function for single or multiple selections. Sub-portion 48 may reveal a schedule of zones. Sub-portion 48 may provide summary information of current events and upcoming events. This sub-portion, like easy button data displays, may be configurable. Other sub-portions may be viewed with a movement of bar 49, such as a sub-portion which indicates tenant bill information. This may be an administrative action that is not necessarily attached to any selected node. Visual treatments may be considered for global and administrative type of functions.

Figure 3:
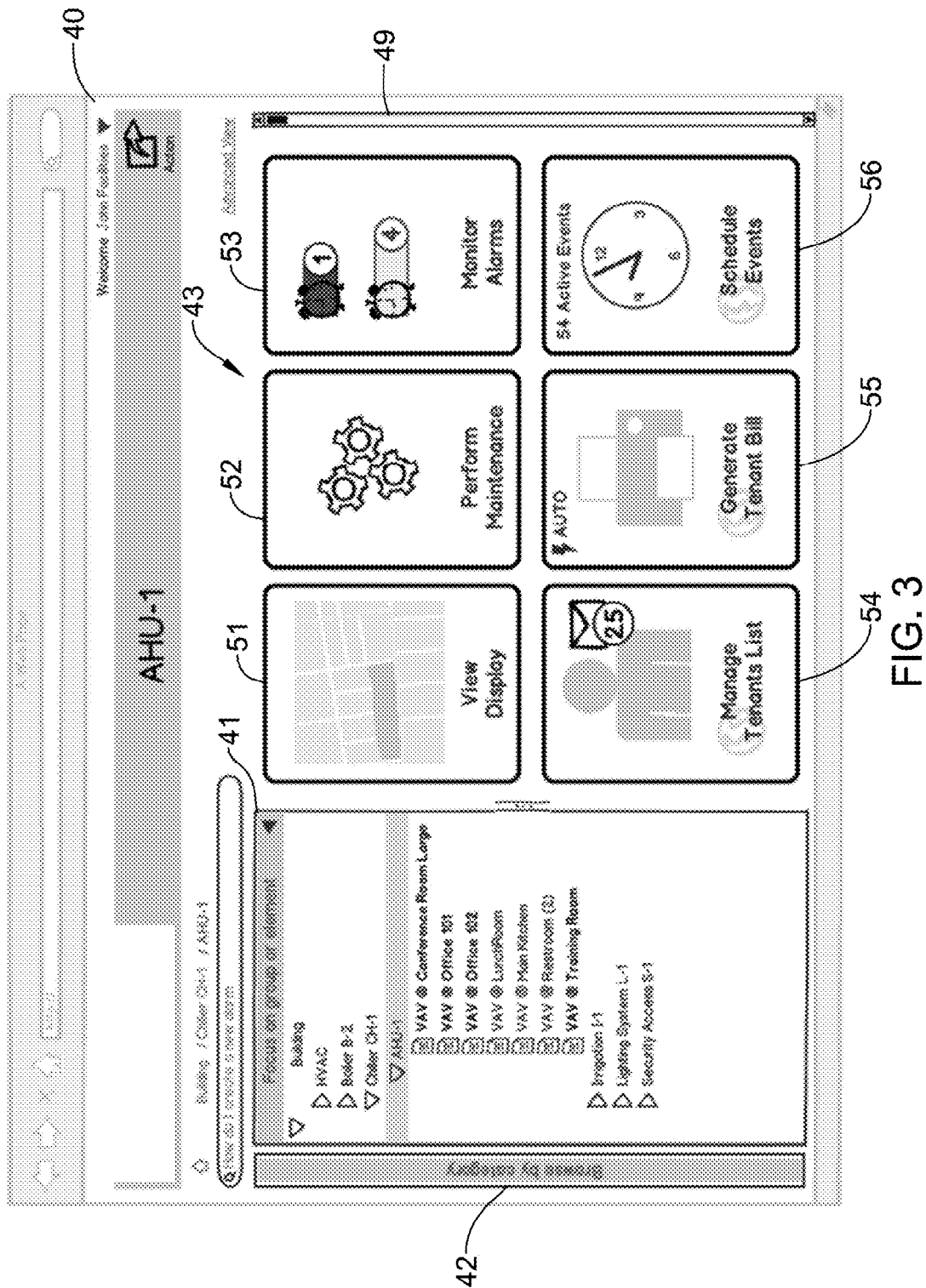
FIG. 3 is a diagram of a screen with an air handling unit selected from explorer tree, resulting in an information and data portion.

FIG. 3, like FIG. 2, is a diagram of screen 40 with an AHU-1 selected from explorer tree 41, resulting in an information and data portion 43. Instead of selecting the boiler of the building, a chiller CH-1 may be selected, and within the chiller, the air handling unit AHU-1 may be selected resulting in pertinent sub-portions in portion 43 of screen 40. VAV's for various rooms may be listed under the selected AHU. A focus may be on a group or element in tree 41.

Sub-portion 51 may display a room layout of an area covered by the AHU and its VAV's. Sub-portion 52 may indicate a perform maintenance reminder. Sub-portion 53 may indicate monitoring of certain alarms. Sub-portion 54 may indicate management of a tenants' list and sub-portion 55 may indicate generation of tenants' bills. Event scheduling may be shown with sub-portion 56. Bar 49 of screen 40 may be scrolled to view other sub-portions for the AHU.

Figure 4:
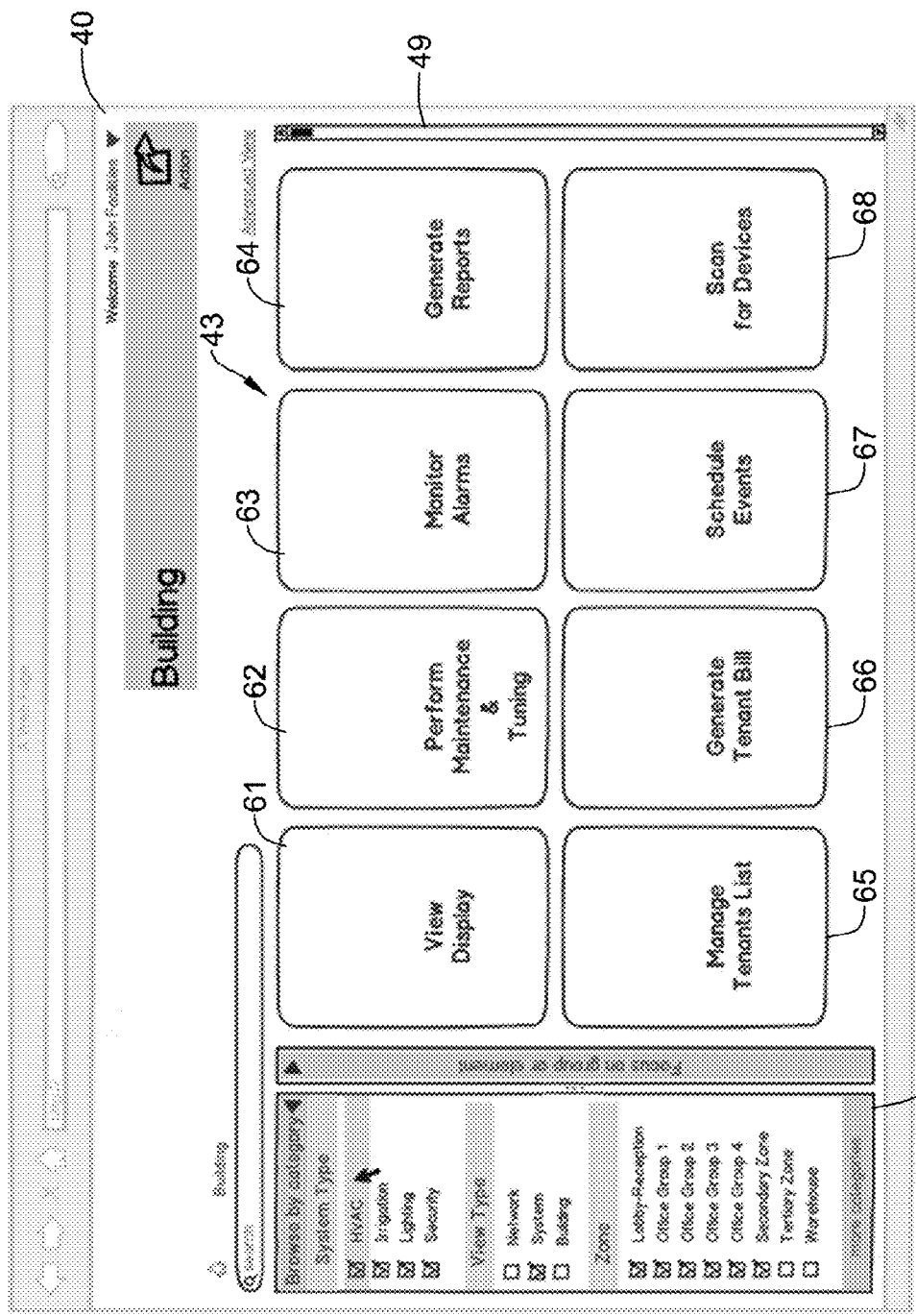
FIG. 4 is a diagram that includes a navigation tree for browsing by category, and covering a building.

FIG. 4 is a diagram that includes a navigation tree 41 for browsing by category, and covering a building. Categories may incorporate, for instance, a network, system and building as a viewing type. Examples of sub-portions 61-68 for the building may incorporate view display, perform maintenance and tuning, monitor alarms, generate reports, manage tenants' lists, generate tenants' bills, schedule events, and scan for devices, respectively.

Figure 5:
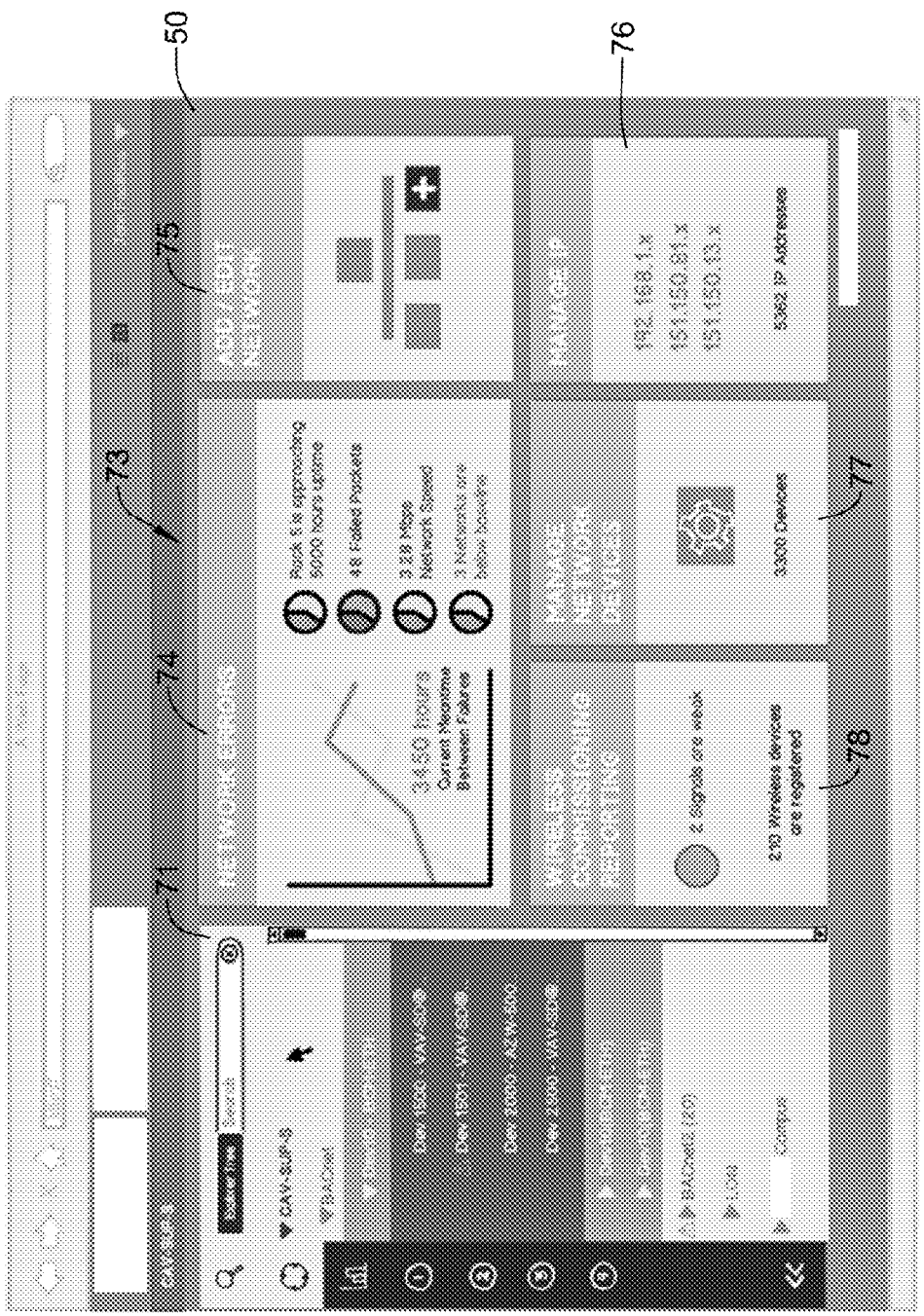
FIG. 5 is a diagram of a screen with tiled information such as sub-portions that make up a portion.

FIG. 5 is a diagram of a screen 50 with tiled information as sub-portions 74-78 that make up a portion 73. An explorer tree 71 may fill in another portion of screen 50. Network errors sub-portion 74 may show a current meantime (e.g., 3450 hours) between failures. More specific information in sub-portion 74 may incorporate examples of information such as a rack 5 is approaching 5000 hours of uptime, there are 48 failed packets, the network speed is 3.28 Mbps, and 3 networks are below baseline. Sub-portion 75 may show a diagram of add/edit network information. Managing IP (internet protocol) such as 5362 IP addresses with a listing of the addresses may be shown in sub-portion 76. Managing network devices, such as 3300 devices, may be indicated in sub-portion 77. Reporting wireless commissioning in sub-portion 78 may, for instance, reveal 2 weak signals among 210 registered wireless devices. Many other examples of tiled information may be revealed.

Smart buttons may be embedded in various screen types, such as embedded as secondary information on a graphic display. Smart buttons may be positioned, resized, and so on. A smart button may support multiple data display types. Examples may incorporate text displays, charts, graphs, image states, and animation.

Figure 6:
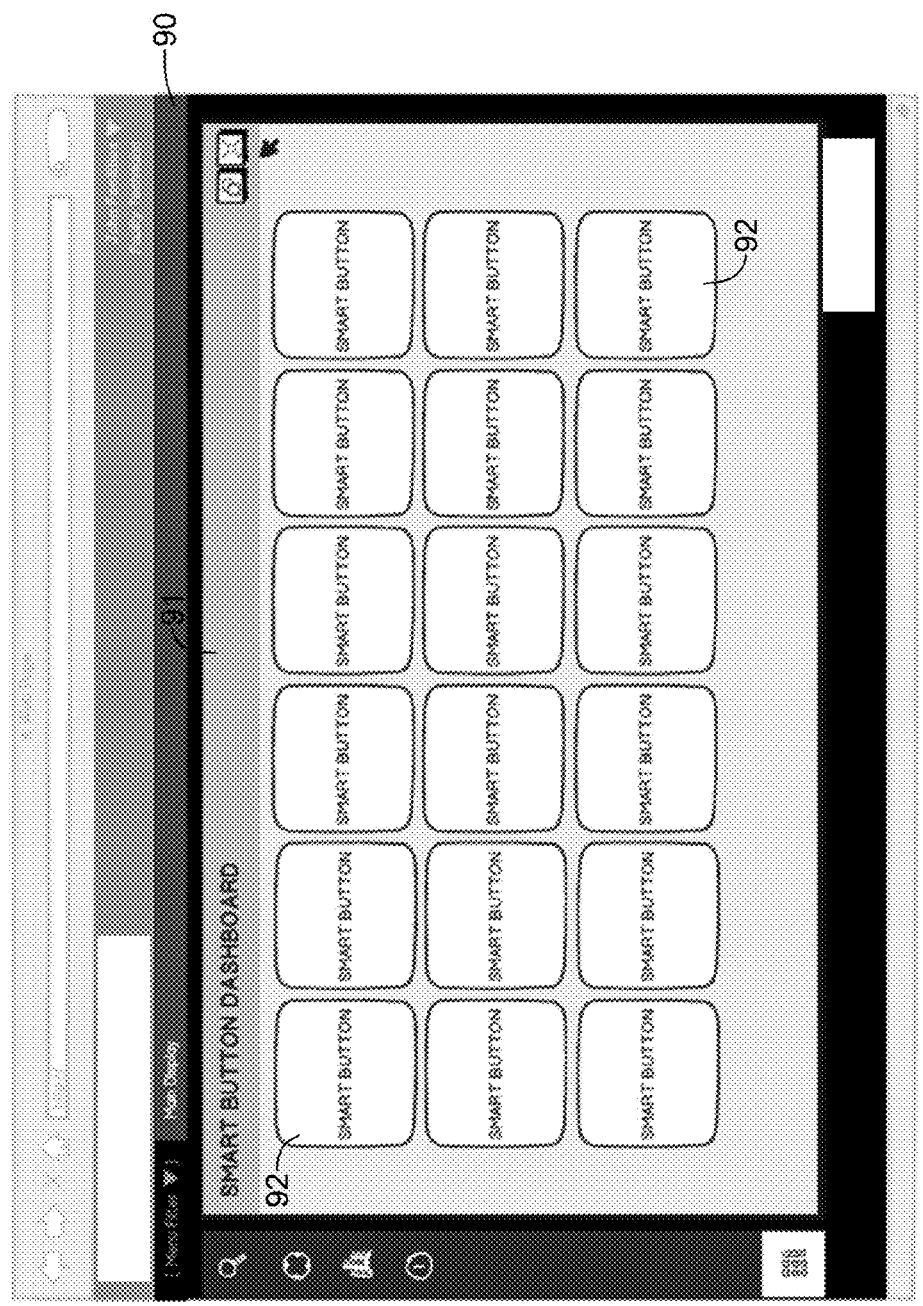
FIG. 6 is a diagram of a screen showing a dashboard that may incorporate an array of smart buttons.

FIG. 6 is a diagram of a screen 90 showing a dashboard 91 that may incorporate an array of smart buttons 92. The user interface visual specifications for the smart button itself may be a feature. Having multiple user interface states may be a common approach. The actual visual state specifications may change from the FIG. 6 but there may always be visual states.

What makes the smart button/tile different is the delivery of deep real-time content. The smart button may behave like a standard button "with" an additional ability to display deep system content. The content display on the smart button is itself not necessarily interactive but it is dynamic and real time.

One example may be a smart button for an energy log screen. The smart button for an energy log screen may contain dynamic real-time summary information of the energy log. This information may be in the form of a mini-graphic chart or a simple textual display. The actual display may be customizable and configurable and subject to any graphic design. When the smart button is pressed, the user may be navigated to the actual energy log screen. The beauty of the smart button is that it may lay the foundation for a dynamic real-time dashboard. When multiple smart buttons are laid out on the screen, the user may effectively get a dashboard that allows the user to view the health of a building controls system (or any system) by exposing customizable, relevant, and targeted real-time data.

Figure 7:
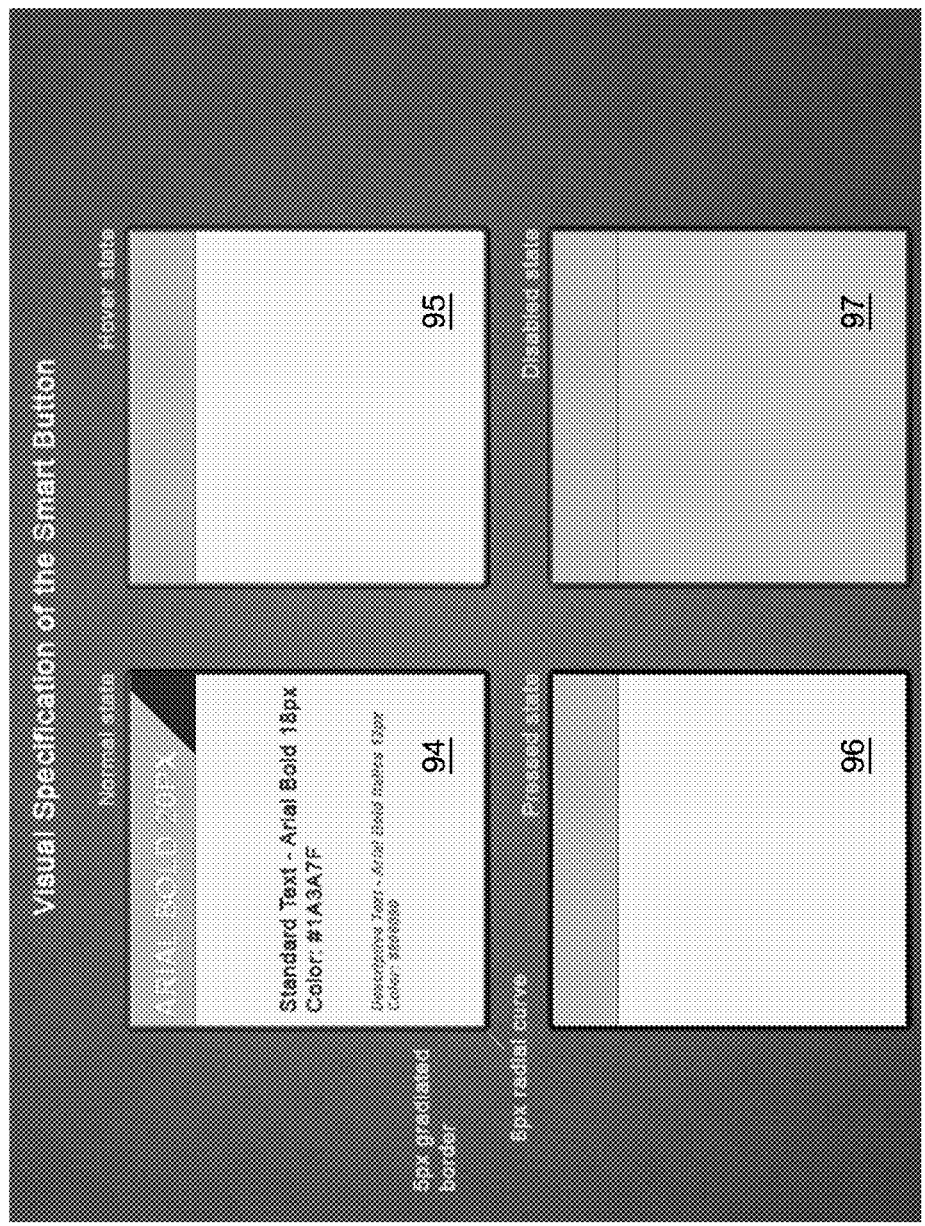
FIG. 7 is a diagram of a visual specification of a smart button.

FIG. 7 is a diagram of a visual specification of a smart button. The specification may incorporate the font and design of appearance for the smart button. Four states of the smart button may be represented by a symbol 94 for a normal state, a symbol 95 for a hover state, a symbol 96 for a pressed state, and a symbol 97 for a disabled state.

Figure 8:
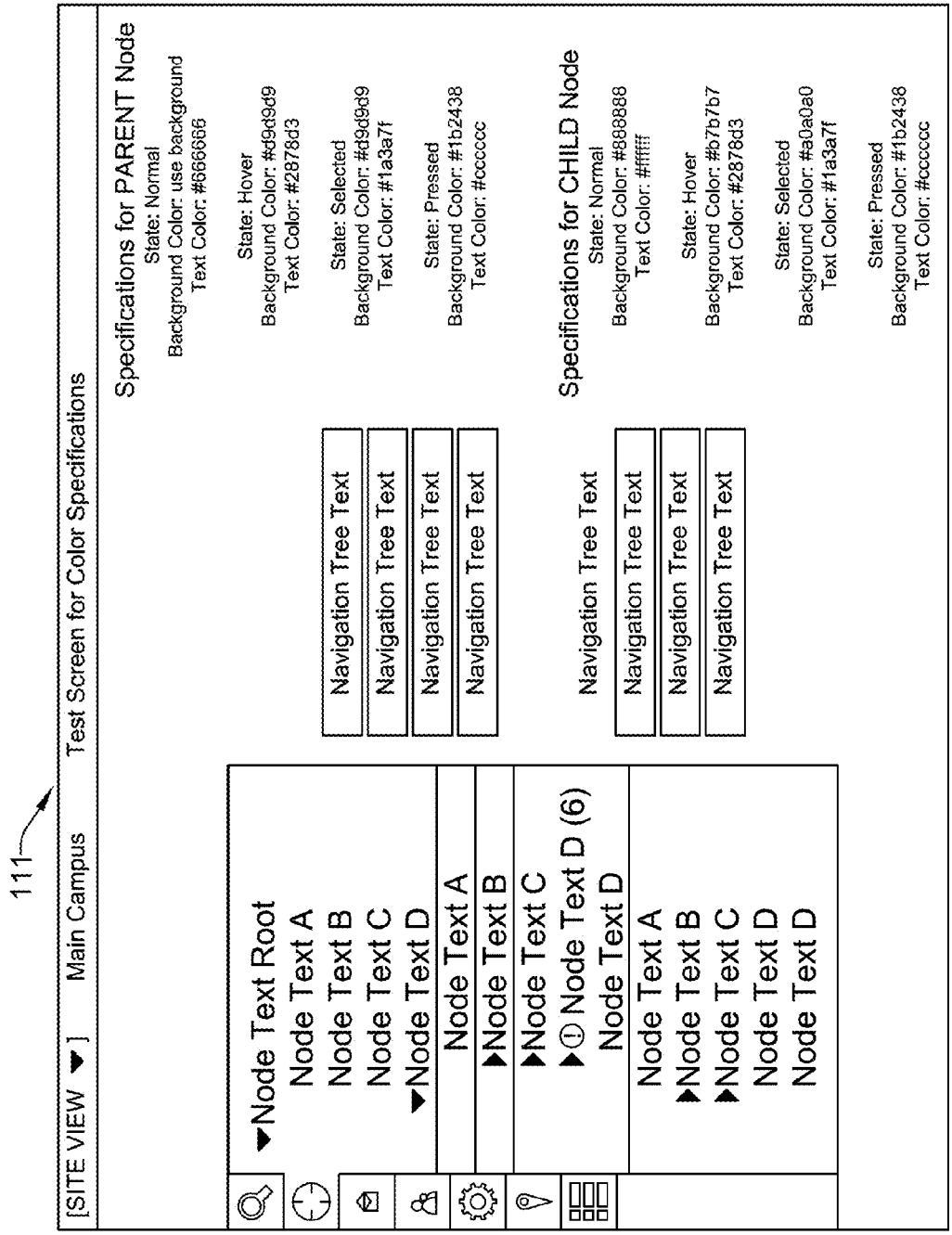
FIG. 8 is a diagram of a screen for specifications.

FIG. 8 is a diagram of a test screen 111 for color specifications, and specifications for parent and child nodes.

Figure 9:
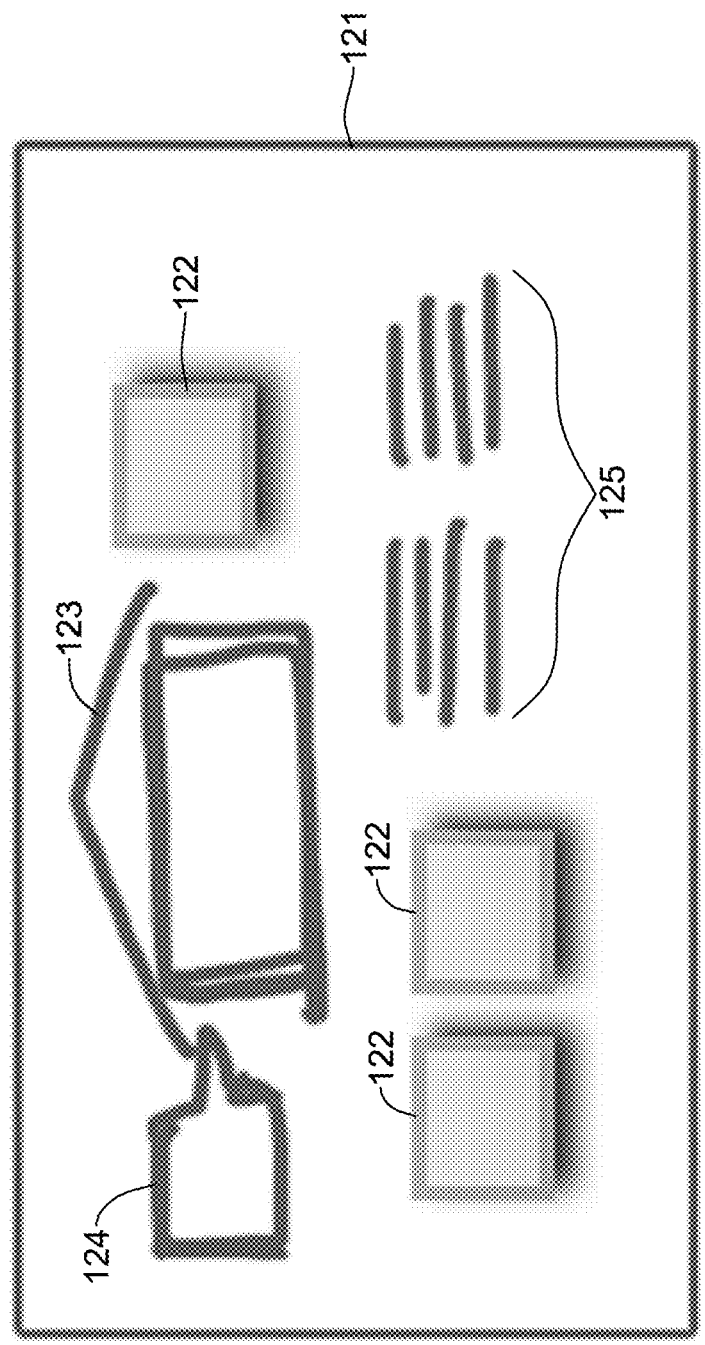
FIGS. 9-14 are diagrams of various smart button features that may be embedded in different building control display screens.

FIGS. 9-14 are diagrams of various smart button features that may be embedded in different building control display screens. FIG. 9 is a diagram of a screen 121 of smart buttons 122 and an image 123 of a structure such as that of a home. Information in a box 124 may relate to image 123. Text 125 may relate to smart buttons 122, image 123, or other items. Screen 121 may be customized or generated.

Figure 10:
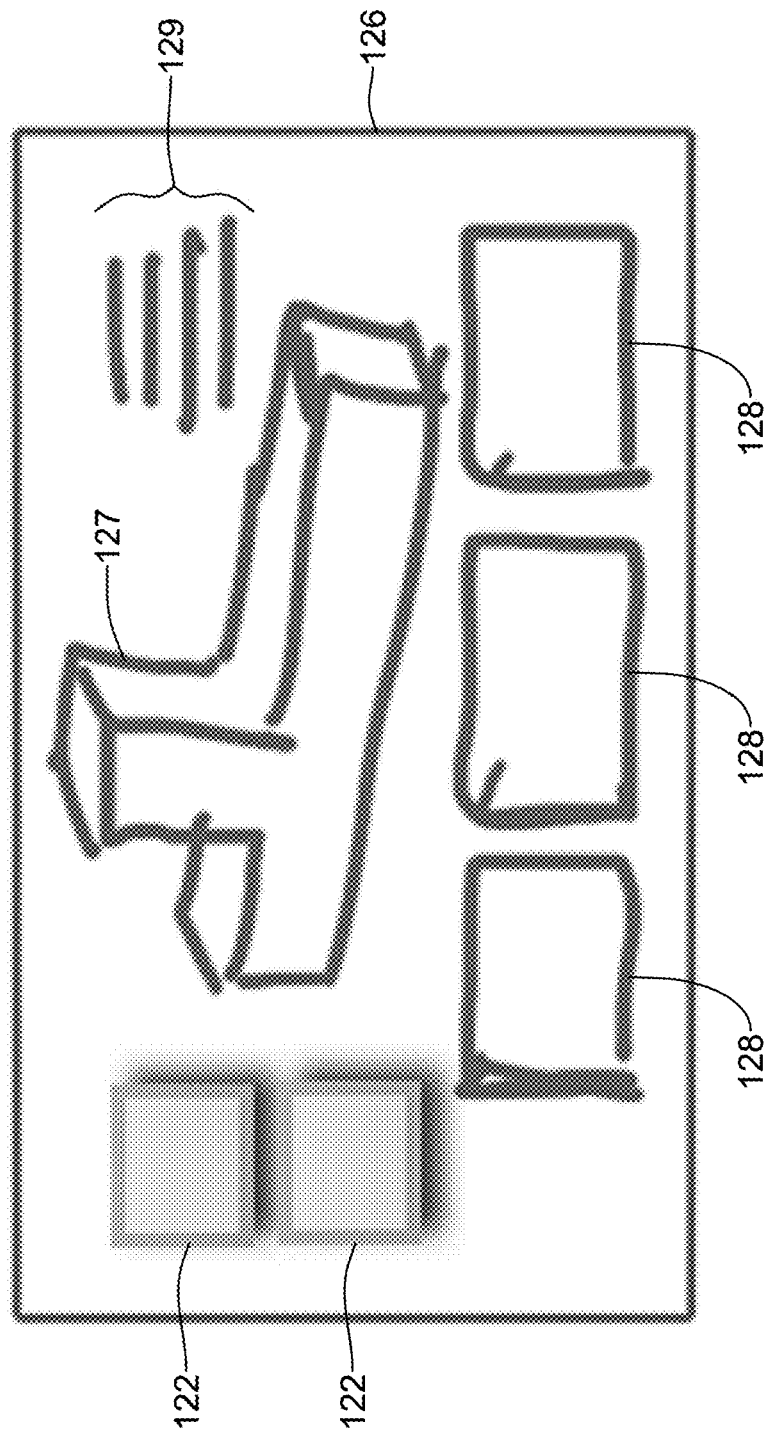

FIG. 10 is a diagram of a screen 126 having smart buttons. There may be an image 127 with a perspective view of a structure such as an HVAC. Text 129 may relate to structure 127. Blocks 128 may be images or text relating to structure 127 or other items. Screen 126 may be a graphic display with or without Omni graphics.

Figure 11:
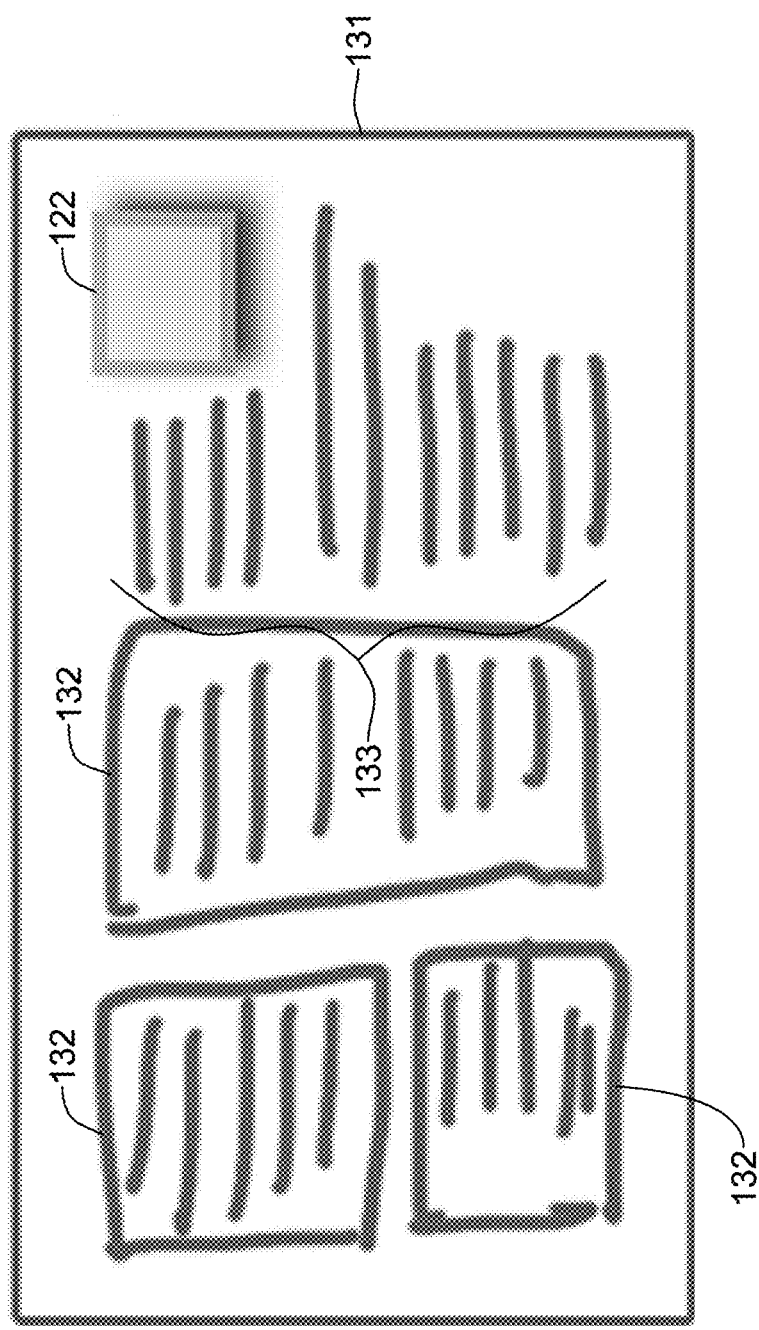

FIG. 11 is a diagram of a screen 131 of properties. The screen may be dynamically generated. A smart button 122 may be used to generate blocks 132 of text and/or images. Other information 133 may appear on screen 131.

Figure 12:
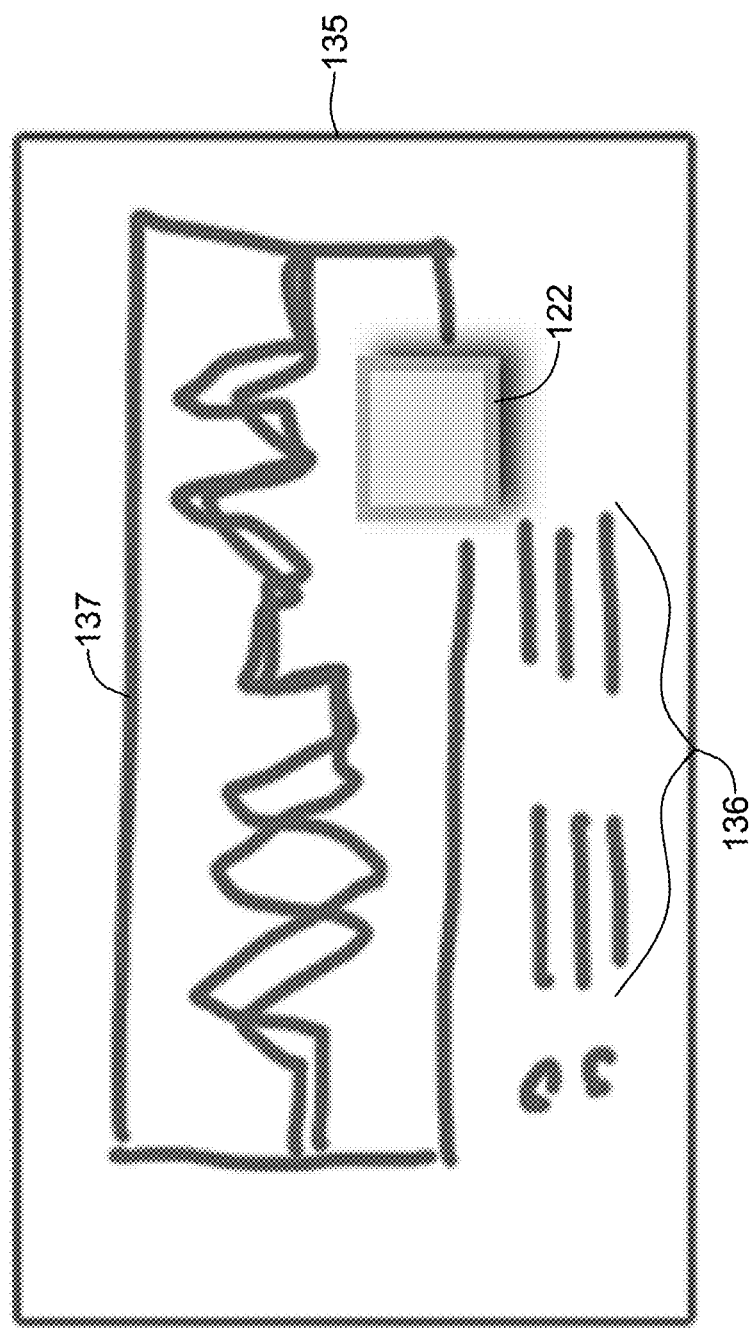

FIG. 12 is a diagram of a screen 135 with a smart button. There may be data or information 136. A data viewer 137 via charts may provide a representation of data or information 136.

Figure 13:
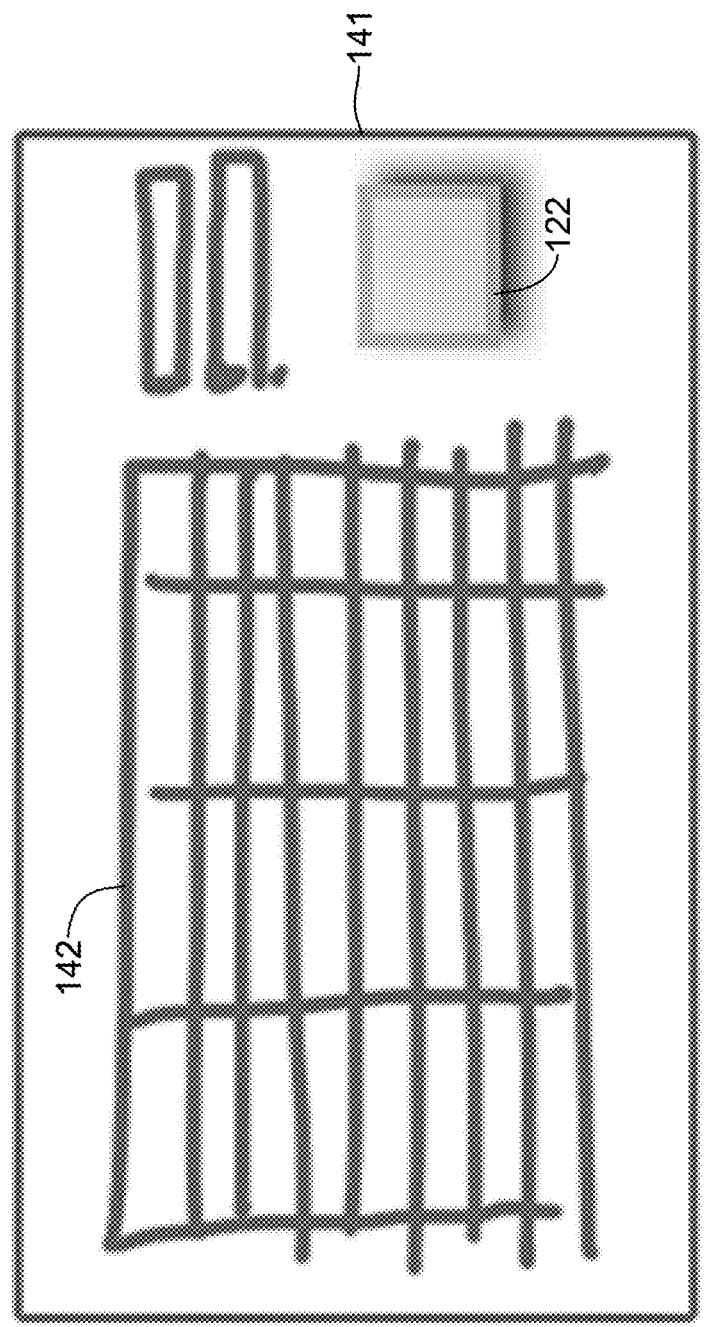

FIG. 13 is a diagram of a screen 141 having a smart button 122 and one or more tables 142 that may relate to smart button 122.

Figure 14:
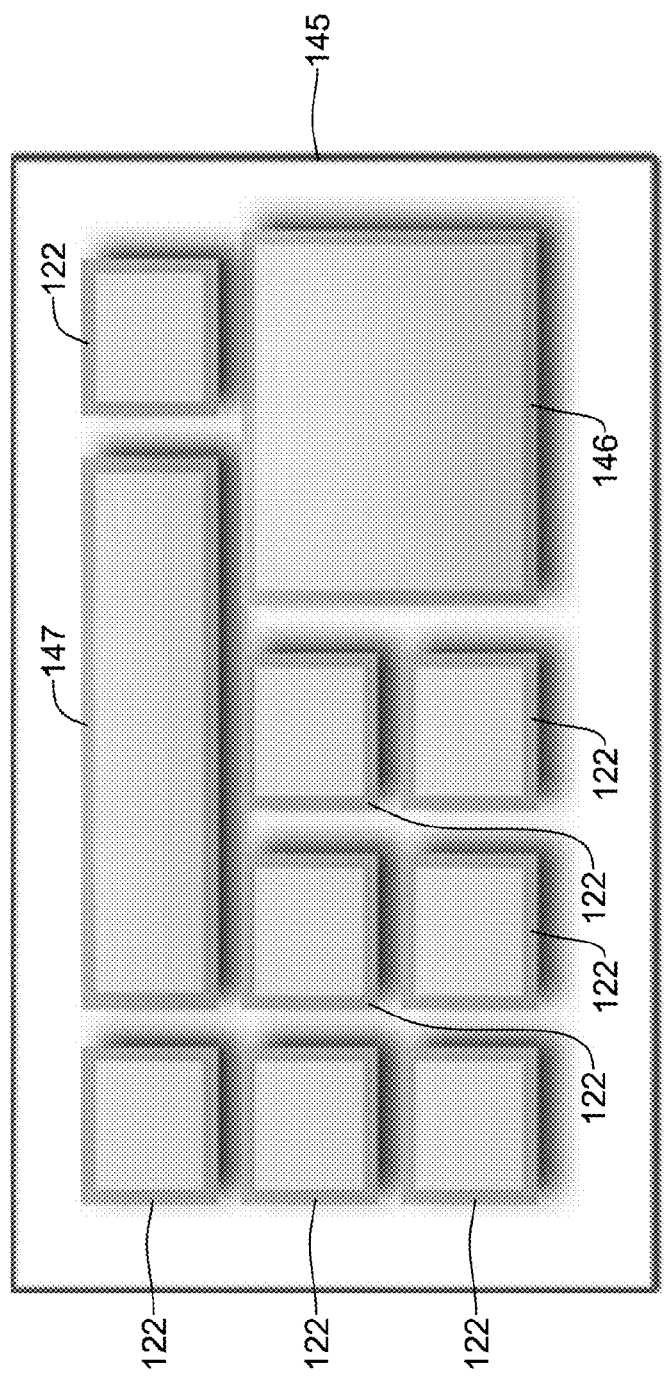

FIG. 14 is a diagram of a screen 145 revealing a dashboard. The dashboard in this instance may a default smart button screen. There may be standard buttons 122, and special buttons 146 and 147.

Figure 15:
FIG. 15 is a diagram of a screen that may pop-up on a dashboard or be a smart button type of screen.

FIG. 15 may be a screen 151 that can pop-up on a dashboard or be a smart button type of screen. The image in screen 151 may reveal a space 153 from a surveillance camera where a temperature sensor in space 153 has indicated a higher than normal temperature revealing a possible fire. The camera image in screen 151 could show a fire in progress.

Figure 16:
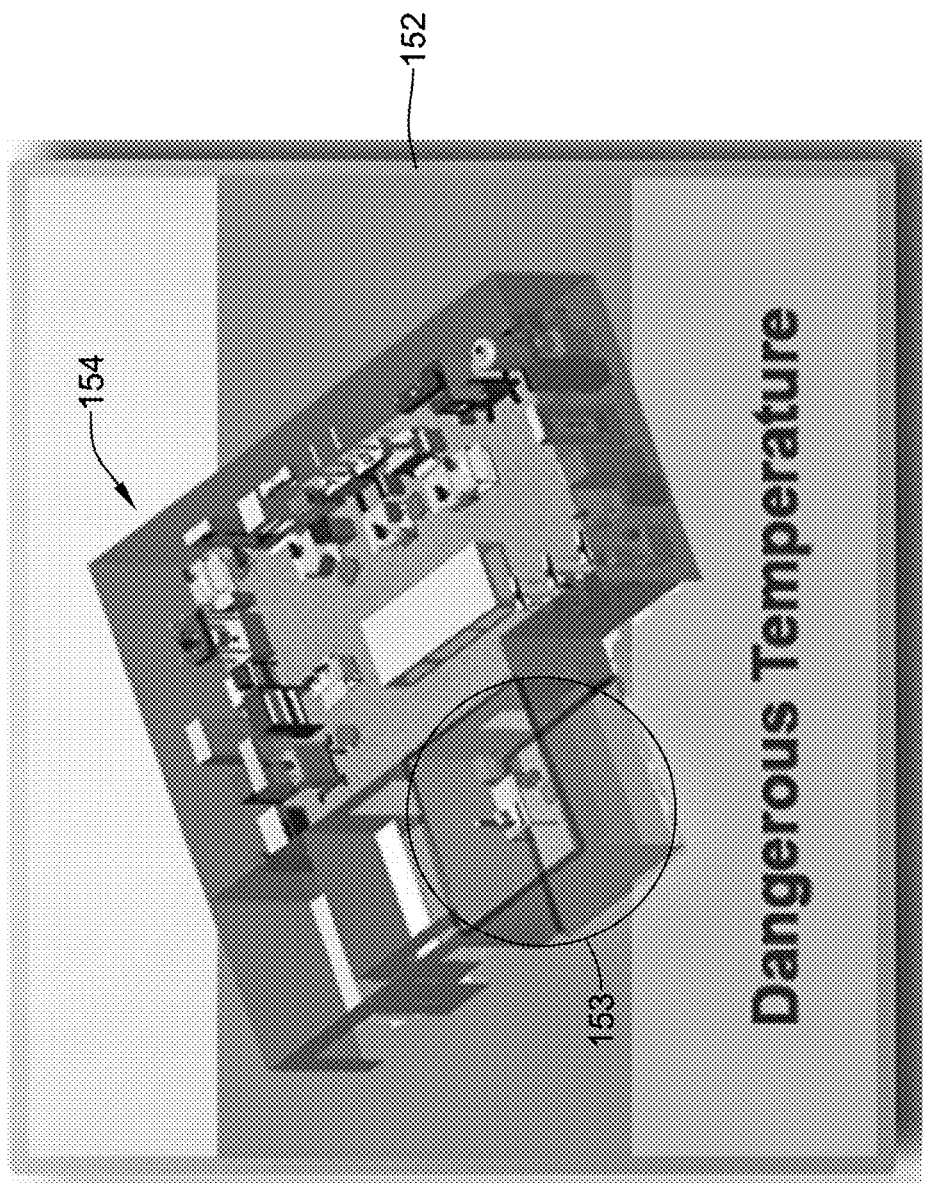
FIG. 16 is a diagram of a screen showing an overall structure of a building in which a space can be located for quick access.

FIG. 16 is a diagram of a screen 152 showing an overall structure of a building 154 in which space 153 can be located for quick access with extinguishing equipment for quickly bring a possible fire under control.

Figure 17:
FIG. 17 is a diagram of a screen revealing space with a temperature too high for the monitored space.

FIG. 17 is a diagram of a screen revealing space 153, a bacteria laboratory, with a temperature of 92 degrees F., which could mean that, rather than a fire ensuing, some bacterial specimens might be in danger of deterioration. Screen 153 may also indicate that an auto-adjustment of the space temperature to 53 degrees F. is going to occur in 30 seconds.

Figure 18:
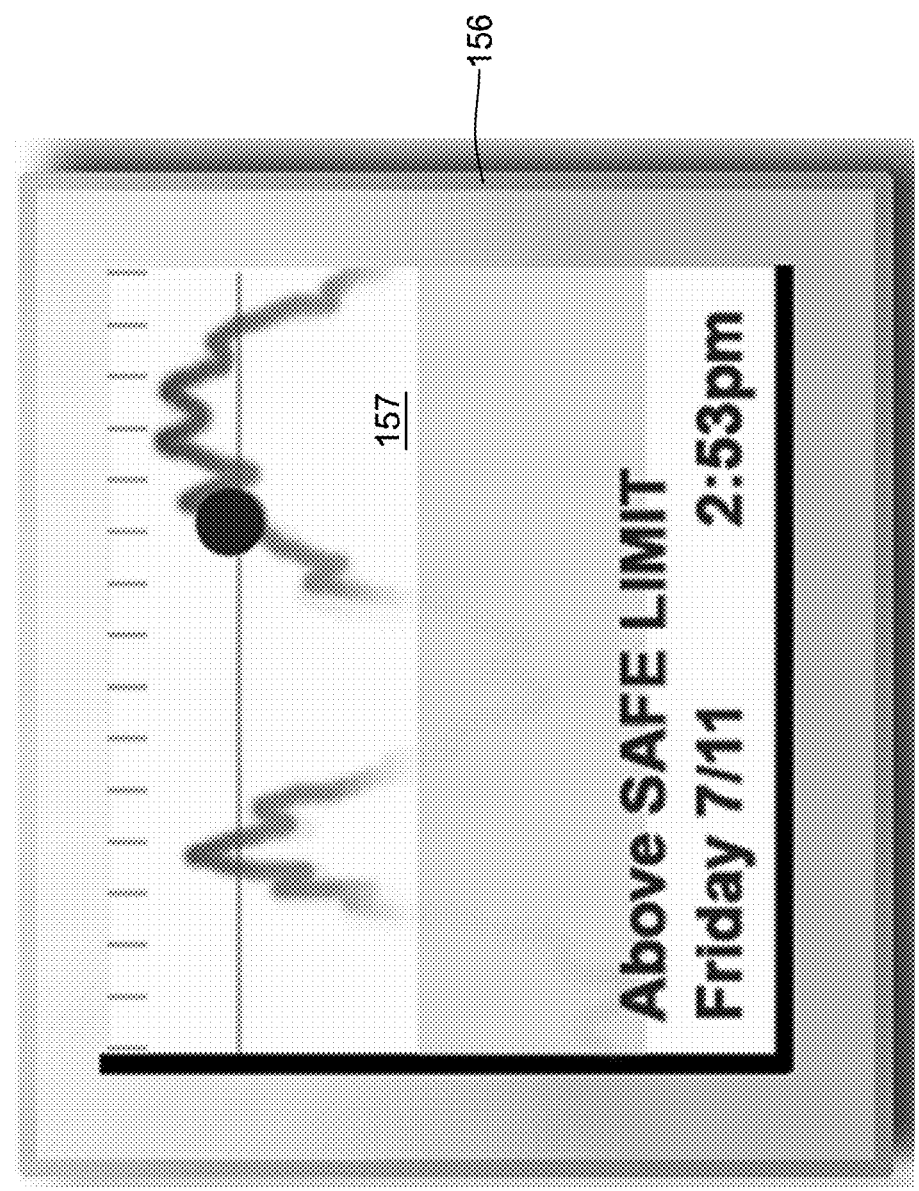
FIG. 18 is a diagram of a screen that indicates a charting of temperature in the space.

FIG. 18 is a diagram of a screen 156 that indicates a charting 157 of temperature in the lab and shows one the temperature exceeding a safe limit.

Figure 19:
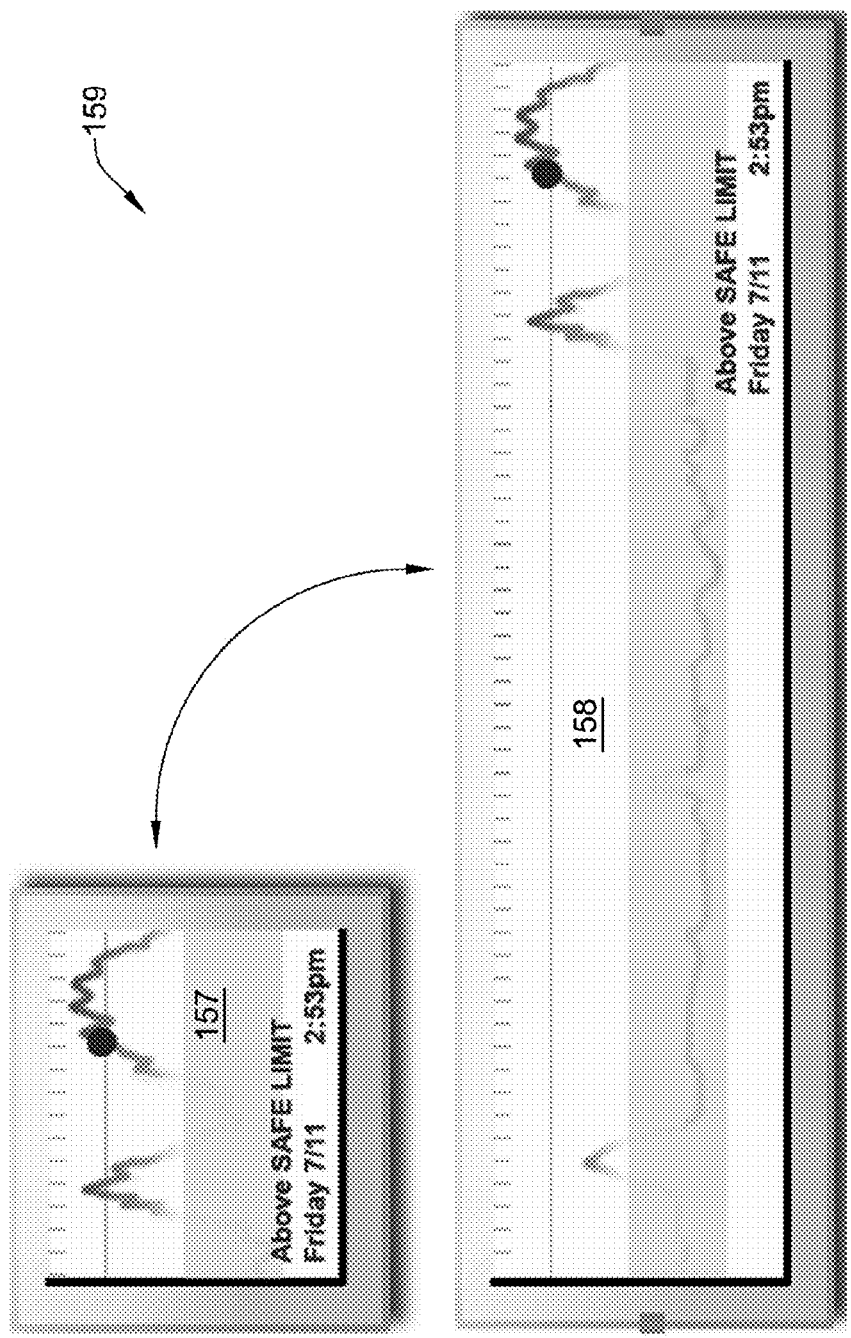
FIG. 19 is a diagram of screen with chart 157 that may be changed in size or position to reveal more information.

FIG. 19 is a diagram of screen 159 with chart 157 that may be changed in size to reveal more information, such as a previous temperature history, or to improve readability of chart 157. Positions of chart 157 may be also changed.

Figure 20:
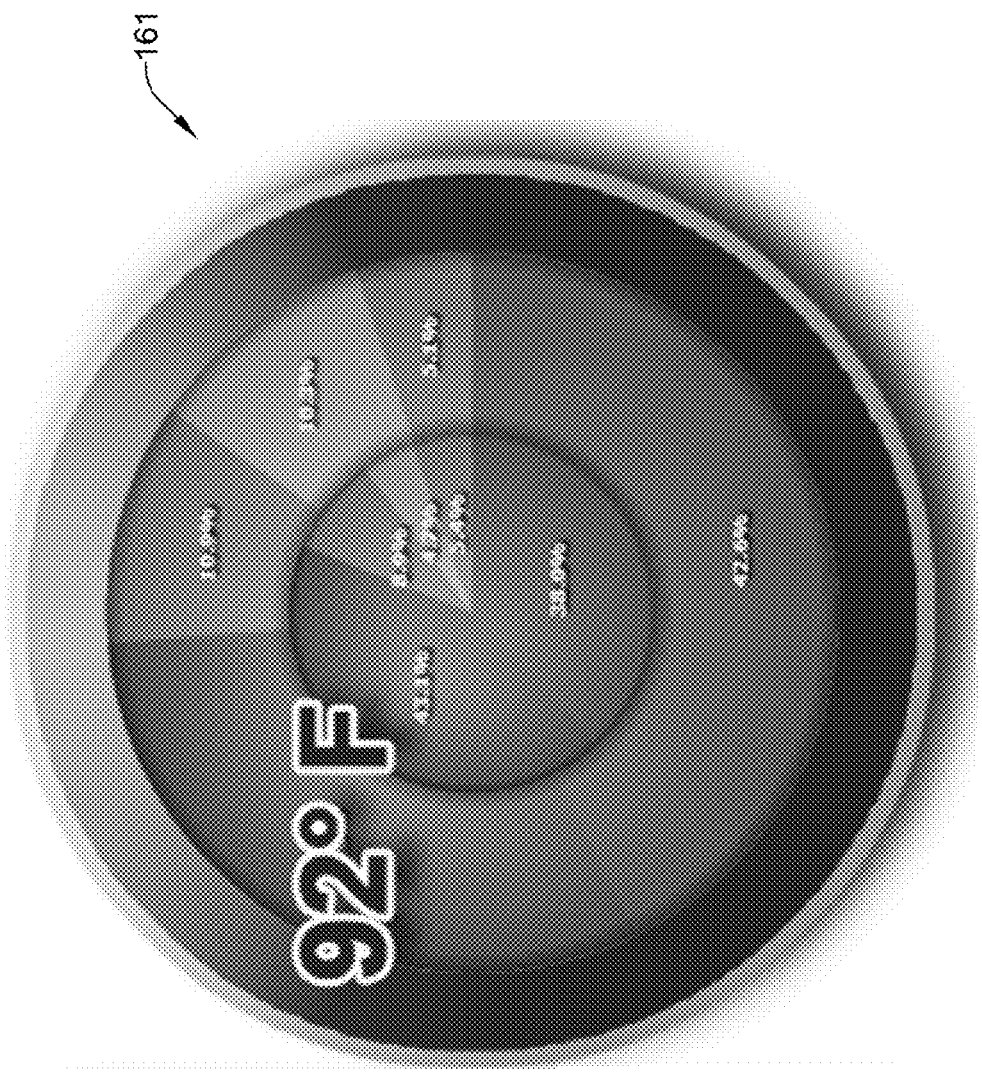
FIG. 20 is a diagram of a screen that may reveal a percentage of time that the temperature was a certain magnitude, greater or less, relative to time showing.

FIG. 20 is a diagram of a screen 161 that may reveal a percentage of time that the temperature was 92 degrees or greater relative to other temperatures at another time showing whether the temperature was increasing or decreasing for the amount of observed times.

Figure 21:
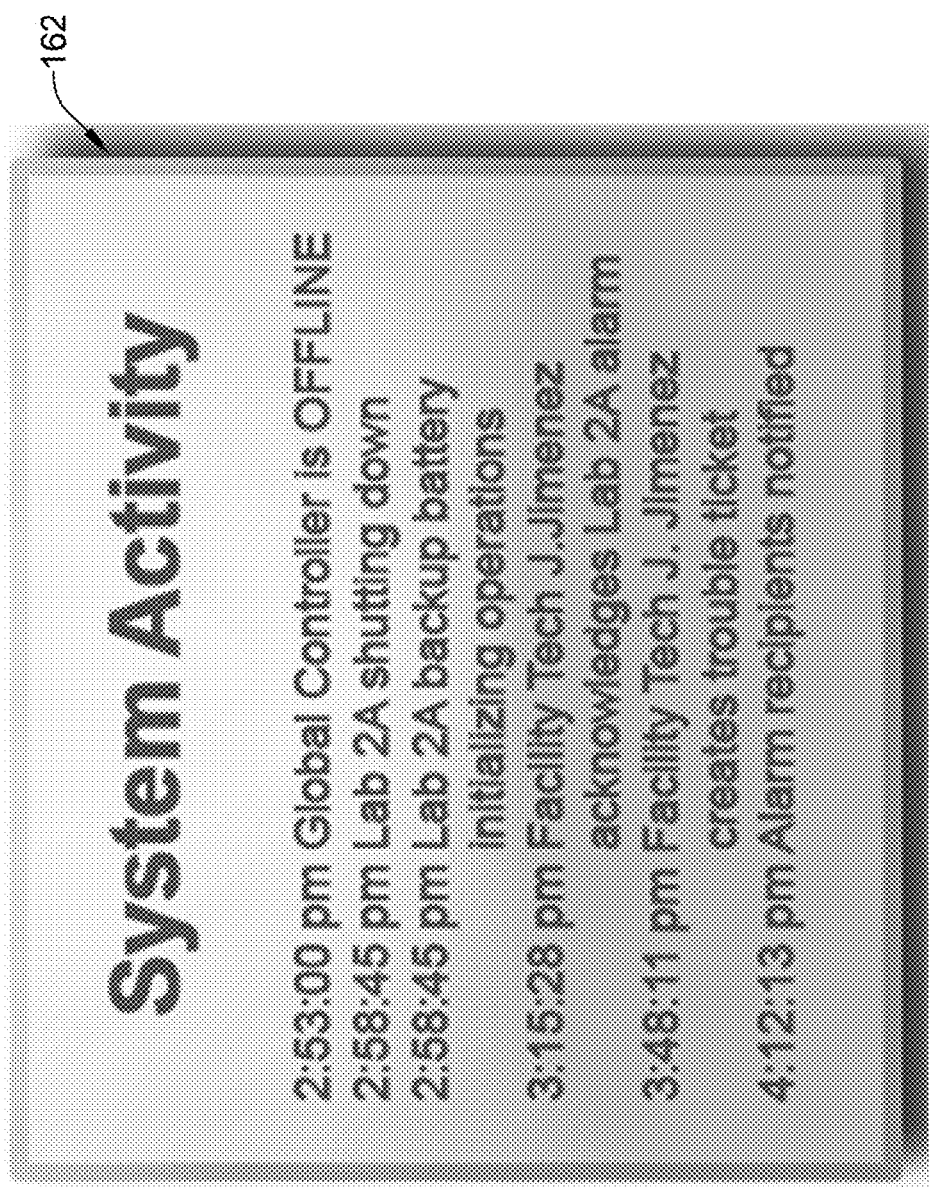
FIG. 21 is a diagram of screen indicating activity of the temperature monitoring system relative to the space of concern, and personnel notifications and actions.

FIG. 21 is a diagram of screen 162 indicating activity of the temperature monitoring system relative to the lab of concern and personnel notifications and actions.

To recap, a dashboard system may incorporate a processor; a memory connected to the processor; a display connected to the processor; a dashboard, having a matrix, available on the display for viewing by a user; and one or more smart buttons situated in the matrix. Activating a smart button of the one or more smart buttons may pull up a summary of information and data of the content at the respective smart button. The information and data may be from monitors and sensors of heating, ventilation and air conditioning equipment of a building. An image of the smart button may be customizable, configurable as to size and position, and adaptable to virtually any graphic design.

The information and data may be displayed in the area of the smart button.

The smart button may provide a foundation for the dashboard system to be dynamic and real-time.

Activating a smart button may incorporate a press or touch of a user or a click of a mouse cursor on the smart button on the matrix.

Activating the smart button may result in an actual screen designated for that button.

Activating the smart button a second time may result in more information at the button. The information may be derived from customizable, relevant and targeted data. The information may be in a form of a mini-graphic chart or a simple textual display. The mini-graphic chart and simple textual display may be customizable, configurable and subject to virtually any graphic or textual design.

Two or more smart buttons may be laid out in the matrix of the dashboard in an organized fashion. The organized fashion of the smart buttons may permit a user, before activating any of the smart buttons to view characteristics or health of a building controls system by exposing customizable, relevant and targeted real-time data about the building controls system in an organized fashion.

The smart button may have an appearance of a standard button incorporating the label and displaying content from the monitors and sensors in the building.

The smart button may incorporate one or more visual states. The one or more visual states may be selected from a group consisting of a normal state, a hover state, a pressed state and a disabled state.

Each smart button may incorporate one or more user interface visual specifications. The one or more user interface visual specifications may be selected from a group consisting of a font, font size, font color, border shape, border size, border color, standard text, descriptive text, title text, background design, background color, and graphic zoom sizes.

A background color of the button may indicate a level of information present on the button.

One or more smart buttons may be selected from a group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

An approach for operating a dashboard may incorporate providing a processor, providing a memory connected to the processor, providing a display connected to the processor, obtaining a dashboard having a matrix of smart buttons on the display for viewing, and activating manually a smart button to show information that pertains to a building controls system.

Activating the smart button a second time may result in more information at the button. The information may be derived from customizable, relevant and targeted data. The information may be in a form of a mini-graphic chart or a simple textual display. The mini-graphic chart and simple textual display may be customizable, configurable and adaptable to virtually any graphic or textual design.

Two or more smart buttons may be laid out in the matrix of the dashboard in an organized fashion. The organized fashion of the smart buttons may permit a user before activating any of the smart buttons to view characteristics or health of the building controls system by exposing customizable, relevant and targeted data about the building controls system in an organized fashion.

One or more smart buttons, such as with respect to their labels or actions, may be selected from a group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

A dashboard mechanism may incorporate a processor, a memory connected to the processor, a display connected to the processor, a dashboard having a matrix available on the display for viewing by a user, and one or more smart buttons situated in the matrix. A smart button of the one or more smart buttons, when activated, may reveal content that pertains to a building of interest.

The smart button may have an appearance of a standard button incorporating the label and having an ability to display deep real-time content of a controls system of the building. The information and data may be displayed in the area of the smart button. A display of the smart button may be customizable, configurable and adaptable to virtually any graphic design.

The smart button may incorporate one or more visual states. The one or more visual states may be selected from a group consisting of a normal state, a hover state, a pressed state and a disabled state. Each smart button may incorporate one or more user interface visual specifications. The one or more user interface visual specifications may be selected from a group consisting of a font, font size, font color, border shape, border size, border color, standard text, descriptive text, title text, background design, background color, and graphic zoom sizes. Background color of the button may indicate a level of information in terms of detail present on the button.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A real-time dashboard system configured to monitor a building control system for a building, the real-time dashboard system comprising:
   a plurality of devices operatively connected over a network and located throughout the building;
   a processor operatively connected to the plurality of devices over the network;
   a memory operatively connected to the processor and configured to store historical data for two or more of the plurality of devices and at least a relationship between the two or more of the plurality of devices; and
   a user interface including a display, the user interface operatively connected to the processor and the memory and configured to display a real-time dashboard having a plurality of smart buttons arranged in a matrix configuration
   for viewing by a user; and
   wherein:
   the processor is configured to continuously receive real-time data over the network from the two or more of the plurality of devices and process the real-time data and the historical data of the two or more of the plurality devices in combination with the relationship between the two or more of the plurality of devices to obtain an energy log that includes dynamic real-time summary information detailing an overall health of the building control system, wherein activating, via the user-interface, a smart button of the plurality of smart buttons from the real-time dashboard triggers the processor to pull up a portion of the dynamic real-time summary information and use the display to display within an area of the smart button of the real-time dashboard, a continuously changing summary of information and data based on the portion of the dynamic real-time summary information for at least one of the two or more of the plurality of devices.

2. The system of claim 1, wherein the smart button provides a foundation for the dashboard system to be dynamic and real-time.

3. The system of claim 1, wherein activating the smart button comprises a press or touch from the user or a click of a mouse cursor on the smart button on the matrix configuration.

4. The system of claim 1, wherein activating the smart button results in an actual screen displayed on the display designated for that button.

5. The system of claim 1, wherein:
   activating the smart button a second time results in more information at the button;
   the information is derived from customizable, relevant and targeted data;

the information is in a form of a mini-graphic chart or a simple textual display; and the mini-graphic chart and simple textual display are customizable, configurable and subject to virtually any graphic or textual design.

6. The system of claim 1, wherein:

the plurality of smart buttons are laid out in the matrix configuration of the dashboard in an organized fashion; and the organized fashion of the plurality of smart buttons permits a user, before activating any of the smart buttons to view characteristics or health of a building controls system by exposing customizable, relevant and targeted real-time data about the building controls system in an organized fashion.

7. The system of claim 1, wherein the plurality of smart buttons have an appearance of a standard button incorporating a label and displaying content from monitors and sensors in the building.

8. The system of claim 1, wherein:

the plurality of smart buttons comprises one or more visual states; and the one or more visual states are selected from a group consisting of a normal state, a hover state, a pressed state and a disabled state.

9. The system of claim 1, wherein:

each smart button comprises one or more user interface visual specifications; and the one or more user interface visual specifications are selected from a group consisting of a font, font size, font color, border shape, border size, border color, standard text, descriptive text, title text, background design, background color, and graphic zoom sizes.

10. The system of claim 1, wherein a background color of each of the plurality of smart buttons indicates a level of information present on the button.

11. The system of claim 1, wherein one or more smart buttons of the plurality of smart buttons are selected from a group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

12. A method for operating a real-time dashboard configured to monitor a building control system for a building, the method comprising:

providing a processor;

providing a memory connected to the processor;

providing a user-interface including a display connected to the processor;

obtaining a dashboard comprising a matrix configuration of smart buttons on the display for viewing;

receiving real-time data from two or more devices of the building control system at the processor;

receiving historical data and a relationship between the two or more devices from the memory at the processor;

processing the real-time data, the historical data, and the relationship between the two or more devices;

obtaining, in response to the processing, an energy log that includes dynamic real-time summary information detailing an overall health of the building control system;

receiving activation, via the user interface, of a smart button from the smart buttons of the dashboard;

accessing a portion of the dynamic real-time summary information in response to the activation; and displaying on the display, within an area of the smart button, a continuously changing summary of information and data based on the portion of the dynamic real-time summary information for at least one of the two or more devices.

13. The method of claim 12, wherein:

Receiving activation of the smart button a second time results in more information at the button;

the information is derived from customizable, relevant and targeted data;

the information is in a form of a mini-graphic chart or a simple textual display; and the mini-graphic chart and simple textual display are customizable, configurable and adaptable to virtually any graphic or textual design.

14. The method of claim 12, wherein:

the smart buttons are laid out in the matrix configuration of the dashboard in an organized fashion; and the organized fashion of the smart buttons permits a user before activating any of the smart buttons to view characteristics or health of the building controls system by exposing customizable, relevant and targeted data about the building controls system in an organized fashion.

15. The method of claim 12, wherein the smart buttons are selected from a group consisting of a view details display, monitor alarms, view trends, maintenance, view schedule, view display, perform maintenance, manage tenants' list, generate tenants' bills, schedule events, perform tuning, generate reports, scan for devices, network errors, add and edit a network, wireless commissioning reporting, manage network devices, manage IP (internet protocol), an air handler, a building server, a search filter, equipment details, and a navigation tree.

16. A real-time dashboard mechanism configured to monitor a building control system including a plurality of devices located throughout a building, the real-time dashboard mechanism comprising:

a processor;

a memory connected to the processor and configured to store historical data for two or more of the plurality of devices and at least a relationship between the two or more of the plurality of devices;

a user-interface including a display connected to the processor and the memory and configured to display a real-time dashboard having a plurality of smart buttons arranged in a matrix configuration for viewing by a user; and wherein the processor is configured to continuously receive real-time data from the two or more of the plurality of devices and process the real-time data and the historical data of the two or more of the plurality devices in combination with the relationship between the two or more of the plurality of devices to obtain an energy log that includes dynamic real-time summary information detailing an overall health of the building control system, wherein activating, via the user-interface, a smart button of the plurality of smart buttons from the real-time dashboard triggers the processor to access a portion of the dynamic real-time summary information and use the display to display within an area of the smart button of the real-time dashboard, a continuously changing summary of information and data based on the portion of the dynamic real-time summary information for at least one of the two or more of the plurality of devices.

17. The mechanism of claim 16, wherein:

the smart button has an appearance of a standard button incorporating a label and having an ability to display deep real-time content of a controls system of the building;

the information and data are displayed in the area of the smart button; and a display of the smart button is customizable, configurable and adaptable to virtually any graphic design.

18. The mechanism of claim 16, wherein:

the smart button comprises one or more visual states;

the one or more visual states are selected from a group consisting of a normal state, a hover state, a pressed state and a disabled state;

each smart button comprises one or more user interface visual specifications; and the one or more user interface visual specifications are selected from a group consisting of a font, font size, font color, border shape, border size, border color, standard text, descriptive text, title text, background design, background color, and graphic zoom sizes.

19. The mechanism of claim 18, wherein background color of each of the plurality of smart buttons indicates a level of information in terms of detail present on each of the plurality of smart buttons.

* * * * *